United States Patent [19]
Wulff et al.

[11] 4,039,511
[45] Aug. 2, 1977

[54] PROCESS FOR THE MANUFACTURE OF POLYETHERS FROM BISPHENATES AND SULFONYL HALIDES

[75] Inventors: Harald Wulff, Limburgerhof; Gerd Blinne, Freinsheim, both of Germany

[73] Assignee: BASF Aktiengesellschaft, Ludwigshafen, Germany

[21] Appl. No.: 622,102

[22] Filed: Oct. 14, 1975

[30] Foreign Application Priority Data

Oct. 25, 1974  Germany .............................. P2450789

[51] Int. Cl.$^2$ .............................................. C08G 65/40
[52] U.S. Cl. ......................................... 260/49; 260/50
[58] Field of Search .................................... 260/49, 50

[56] References Cited
U.S. PATENT DOCUMENTS 3,658,757  4/1972  Conix et al. .............................. 260/49
3,832,331  8/1974  Newton .................................... 260/49

Primary Examiner—Lester L. Lee
Attorney, Agent, or Firm—Keil, Thompson & Shurtleff

[57] ABSTRACT

Process for the manufacture of polyethers, particularly sulfonyl group-containing aromatic polyethers. Alkali metal bisphenolates are reacted with arylsulfonyl halides and polycondensed. The polyethers are plastics which are resistant to high temperatures and may be used for making electrical appliances and circuits, household articles and sheeting.

3 Claims, No Drawings

PROCESS FOR THE MANUFACTURE OF POLYETHERS FROM BISPHENATES AND SULFONYL HALIDES

This invention relates to a novel process for the manufacture of polyethers which are resistant to high temperatures, particularly aromatic polyethers containing sulfonyl groups.

Polymers containing sulfonyl and ether groups are known. For example, German Published Application Nos. 1,520,131 and 1,520,379 describe processes for the manufacture of polysulfone ethers from aromatics and aromatic sulfochlorides. However, the sulfochlorides must be synthesized in a preliminary stage. According to German Published Application Nos. 1,545,106 and 1,795,725, polysulfone ethers are prepared by reacting aromatic alkali metal phenolates with aromatic halogen compounds. Here again, the starting materials are relatively expensive or must be synthesized in a preliminary stage. Furthermore, these processes require highly specialized, narrow processing conditions.

It is an object of the present invention to provide a process for the manufacture of polyethers, particularly polyethers containing sulfonyl groups, which process provides the desired polymers in steps which are simple to carry out and using cheap starting materials.

We have found that bisphenolates of the formula

where Me is an alkali metal or onium cation and Ar is an aromatic radical, can be condensed with a sulfonyl halide of the formula

where X is chlorine or bromine and Ar' is an aromatic radical, to give polyethers.

Preferred bisphenolates are sodium and potassium salts. The alkali metal cation may, however, be partially or completely replaced by organic onium cations such as a quaternary ammonium ion. Suitable bisphenols are resorcinol, pyrocatechol, hydroquinone and 4,4-dihydroxy-diphenyl. We prefer to use those which can be represented by the formula

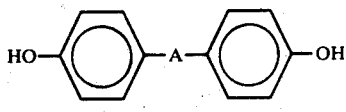

In this formula A can denote —CH$_2$—, —C(CH$_3$)$_2$—, —O—, —S—, —CO— or —SO$_2$—. Particularly suitable is the disodium or dipotassium salt of bis(4-hydroxyphenyl) sulfone.

The bisphenolates may be prepared by reacting one mole of a bisphenol with 2 moles of an alkali metal hydroxide. This reaction is advantageously carried out in polar solvents such as dimethylsulfone, diphenylsulfone, 1,1-dioxothiolane, dimethylsulfoxide, N-methylpyrrolidone, dimethylformamide and dimethylacetamide, which solvents may, if desired, be used together with other solvents capable of forming an azeotrope with water, for example toluene, chloroform, carbon tetrachloride and chlorobenzene. The water present or formed is removed from the reaction mixture during the salt formation substantially quantitatively, e.g. by distillation of an azeotrope.

The sulfonyl halides used are preferably aromatic sulfonyl chlorides such as benzene sulfochloride or aromatic sulfochlorides substituted by alkyl or alkoxyl groups, e.g. p-toluene sulfochloride and p-methoxybenzene sulfochloride.

According to a preferred embodiment of the process of the invention, one mole of bisphenolate is reacted, in a first stage, with $1 + x$ ($x = 0$ to 1) mole of a sulfonyl halide at temperatures ranging from −50° to +150° C and preferably from 0° to 100° C, with the elimination of metal halide MeX. In a subsequent second stage, polycondensation is carried out with $x$ moles of bisphenolate at temperatures of from 150° to 350° C and preferably from 200° to 300° C, giving elimination of metal sulfonate MeSO$_3$Ar. In this reaction $x$ is preferably 0 to 1.

For example, one mole of bisphenolate can be reacted with about one mole of sulfonyl halide in the first stage at temperatures of from −50° to +150° C. If desired, a solvent may be used, but it is not necessary for the components to be completely dissolved thereby. All conventional organic solvents are suitable provided they do not react with the starting compound and are liquid at the reaction temperature. When this first reaction stage is complete, the solvent is evaporated and the reaction mixture is condensed to polyethers in a second stage at temperatures of from 150° to 350° C.

Alternatively, the sulfonyl halide may be reacted with bisphenolate in the first stage in a molar ratio of more than 1 : 1 to 2 : 1 under the reaction conditions described. For example, if one mole of disodium-bis-(4-hydroxyphenyl)-sulfone is reacted with 2 moles of benzene sulfochloride, there is obtained bis-(4-phenylsulfonyloxyphenyl)-sulfone, which may then be condensed, in the subsequent polycondensation stage, again with one mole of disodium-bis-(4-hydroxyphenyl)-sulfone to form the polyether. This condensation is preferably carried out in a solvent which has already been used for the synthesis of the alkali metal salt. At a lower excess of sulfonyl halide, e.g. a ratio of from 1.5 : 1, there are obtained in the first stage mixtures of bis-(4-phenylsulfonyloxyphenol)-sulfone and the sodium salt of 4-(4-phenylsulfonyloxyphenyl-sulfone) -phenol, which may then be condensed with appropriately smaller quantities of disodium-bis-(4-hydroxyphenyl)-sulfone to form the polyethers.

The halide forming during the reaction in the first stage may be removed by suitable methods together with the sulfonate forming during condensation, e.g. by dissolving the polycondensation product in a suitable solvent, filtering off and reprecipitating the polyether.

The polyethers prepared in the manner of the invention are valuable plastics which are resistant to high temperatures. Their intrinsic viscosities $\eta_{inh}$ (measured at 24° C on a 1% solution in concentrated sulfuric acid) are generally above 0.15 and preferably between 0.2 and 1.0. They are soluble in halogenated hydrocarbons such as chloroform or carbon tetrachloride and in polar solvents such as dimethyl sulfoxide, N-methylpyrrolidone and dimethylformamide. They soften at temperatures above about 280° C without appreciable decomposition so that they can be processed thermoplastically, e.g. by injection molding or extrusion.

The polyethers and particularly the polyether sulfones may be used in the manufacture of electrical appliances, e.g. for making housings and circuits and also in the manufacture of household articles and sheeting or fibers resistant to high temperatures.

In the following Examples the parts and percentages are by weight.

EXAMPLE 1 a. 125 of bis-(4-hydroxyphenyl)-sulfone in 350 parts of N-methylpyrrolidone and 200 parts of toluene are mixed with 80 parts of a 50% aqueous caustic soda solution. All of the water is then removed azeotropically with the aid of the toluene. 176 parts of benzene sulfochloride are added dropwise at room temperature. The mixture is stirred for 3 hours at this temperature and then for 3 hours under reflux. The product is precipitated with methanol and recrystallized twice from ethanol. There is obtained colorless bis-(4-benzenesulfonyloxyphenyl)-sulfone having a melting point of 133°-134° C.

b. 35.5 parts of bis-(4-hydroxyphenyl)-sulfone are dissolved in 250 parts of chlorobenzene and 80 parts of 1,1-dioxothiolane at 60° C and to the solution there are added 33.6 parts of a 50% potassium hydroxide solution. Water and chlorobenzene are then distilled off completely. At about 100° C, 79.5 parts of bis-(4-benzenesulfonyloxyphenyl)-sulfone from stage (a) are added and the reaction mixture is heated for 6 hours at 220° C. The polymer is precipitated with aqueous ethanol and has an intrinsic viscosity $\eta_{inh} = 0.20$.

EXAMPLE 2

25 parts of bis-(4-hydroxyphenyl)-sulfone are dissolved in 500 parts of 1,1-dioxothiolane and 115 parts of chlorobenzene at 75° C and to the solution there are added 22.4 parts of a 50% caustic potash solution. Water and chlorobenzene are distilled off completely. At room temperature, 19 parts of p-toluene sulfochloride are added. The mixture is stirred at this temperature for 1 hour and the residual solvent is then distilled off in vacuo. The mixture is dried for a further 2 hours under high vacuum at about 180° C and the solid is then polymerized for about 30 minutes at 300° C in an atmosphere of nitrogen. The polymer is dissolved in dimethylformamide, filtered and precipitated with water. It has an intrinsic viscosity $\eta_{inh} = 0.25$ and may be cast to a film from solution.

EXAMPLE 3

11 parts of resorcinol are dissolved in 400 parts of 1,1-dioxothiolane and 100 parts of chlorobenzene and to the mixture there are added 22.4 parts of a 50% caustic potash solution. Water and chlorobenzene are then distilled off completely. At 0° C 19 parts of p-toluene sulfochloride are added. The mixture is stirred for 3 hours at this temperature. The residual solvent is then distilled off in vacuo and the residue is dried for a further 4 hours under high vacuum at about 280° C, whereupon the solid is polymerized for 1 hour at 280° C in an atmosphere of nitrogen. The polymer is dissolved in dimethylformamide, filtered and precipitated with water. It has an intrinsic viscosity $\eta_{inh} = 0.20$ and may be cast to a film from solution.

EXAMPLE 4

21.4 parts of bis-(4-hydroxyphenyl)-ketone are dissolved in 500 parts of 1,1-dioxothiolane and 115 parts of chlorobenzene and to the mixture there are added 22.4 parts of a 50% caustic potash solution. Water and chlorobenzene are distilled off completely. At −20° C, 17.6 parts of benzene sulfochloride are added. The mixture is then stirred for one hour at this temperature. It is then stirred for a further hour at room temperature. The residual solvent is then distilled off in vacuo and the residue is dried for a further 4 hours under high vacuum at about 200° C, whereupon the solid is condensed in 100 parts of diphenylsulfone for about 1 hour at 300° C. It is extracted with methanol, dissolved in dimethylformamide, filtered and reprecipitated with water. The polymer is dried and has an intrinsic viscosity $\eta_{inh} = 0.25$. It may be cast to a film from solution.

We claim:

1. A process for the manufacture of polyethers, wherein one mole of a bisphenolate of the formula

Me—O—Ar—O—Me where Me is an alkali metal or an ammonium, phosphonium or sulphonium cation and —O—Ar—O— is an anion of a bisphenol selected from the group consisting of resorcinol, pyrocatechol, hydroquinone, 4,4-dihydroxydiphenyl and

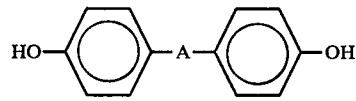

where A is —CH$_2$—, —C(CH$_3$)$_2$—, —O—, —S—, —CO— or —SO$_2$— is reacted, in a first stage, with $1 + x$, ($x = 0$ to 1) moles of an aromatic sulfonyl halide of the formula Ar'—SO$_2$—X where X is chlorine or bromine and Ar' is an aromatic radical, at temperatures of from −50° C to +150° C with the elimination of halide MeX, whereupon, in a second stage, polycondensation is carried out at temperatures of from 150° to 350° C with $x$ (X = 0 to 1) mole of bisphenolate to form polyethers with elimination of sulfonate MeSO$_3$Ar'.

2. A process for the manufacture of polyethers as claimed in claim 1, wherein one mole of bisphenolate is reacted with two mole of sulfonyl halide at temperatures of from −50° C to +150° C, whereupon the reaction product is condensed with a further mole of bisphenolate at temperatures of from 150° to 350° C.

3. A process for the manufacture of polyethers as claimed in claim 1, wherein the disodium or dipotassium salt of bis(4-hydroxyphenyl)-sulfone is reacted with benzene sulfochloride or p-toluene sulfochloride.

* * * * *